United States Patent

Schuler et al.

[11] Patent Number: 5,290,612
[45] Date of Patent: Mar. 1, 1994

[54] BRACKET FOR A SUSPENSION SYSTEM FOR CONTROL UNITS, CONTROL PANELS AND THE LIKE

[75] Inventors: Matthias Schuler, Dietzholztal; Udo Munch, Sinn; Wolfgang Reuter, Burbach, all of Fed. Rep. of Germany

[73] Assignee: Rittal-Werk Rudolf Loh GmbH & Co. KG, Fed. Rep. of Germany

[21] Appl. No.: 887,022

[22] Filed: May 21, 1992

[30] Foreign Application Priority Data

May 21, 1991 [DE] Fed. Rep. of Germany ....... 4116464

[51] Int. Cl.$^5$ .............................................. E04G 13/00
[52] U.S. Cl. .................................. 428/34.1; 428/36.9; 428/122; 428/188; 428/213; 248/276; 248/282; 248/324
[58] Field of Search ...................... 248/276, 282, 281.1, 248/278, 324, 279, 49; 403/79; 428/34.1, 188, 122, 213, 36.9, 36.91

[56] References Cited

U.S. PATENT DOCUMENTS

| | | | |
|---|---|---|---|
| 2,886,079 | 5/1959 | Mann | 248/282 |
| 4,391,426 | 7/1983 | Göthberg | 248/49 |
| 4,427,382 | 1/1984 | Hoffmeister et al. | 248/282 |
| 4,651,966 | 3/1987 | Suzuki | 248/282 |
| 4,699,046 | 10/1987 | Bellieni | 248/281.1 |
| 4,715,077 | 12/1987 | Shepheard | 248/49 |
| 4,836,486 | 6/1989 | Vossoughi et al. | 248/281.1 |
| 4,953,821 | 9/1990 | Reuter et al. | 248/282 |

OTHER PUBLICATIONS

VAW Vereinigte Aluminium-Werke AG-prospectus (Apr. 1989).

Primary Examiner—Ellis P. Robinson
Assistant Examiner—Rena L. Dye
Attorney, Agent, or Firm—Speckman, Pauley & Fejer

[57] ABSTRACT

A bracket for a suspension system for control units, control panels and the like, including a support body portion, having a substantially U-shaped base profile portion that is subdivided, by means of a separation rib extending parallel to its rib, into a closed supporting part and an open, U-shaped receiving part remote from the rib, in which continuous, longitudinally oriented screw receptacles are formed on the support part and the receiving part. To improve the torsional rigidity of the bracket and the entire suspension arrangement, the support part is stiffened in the longitudinal direction of the support body portion by means of two continuous diagonal ribs, which are joined together in the middle, and the screw receptacles of the support part are constructed in the corner regions that the diagonal ribs form with the base profile section.

4 Claims, 1 Drawing Sheet

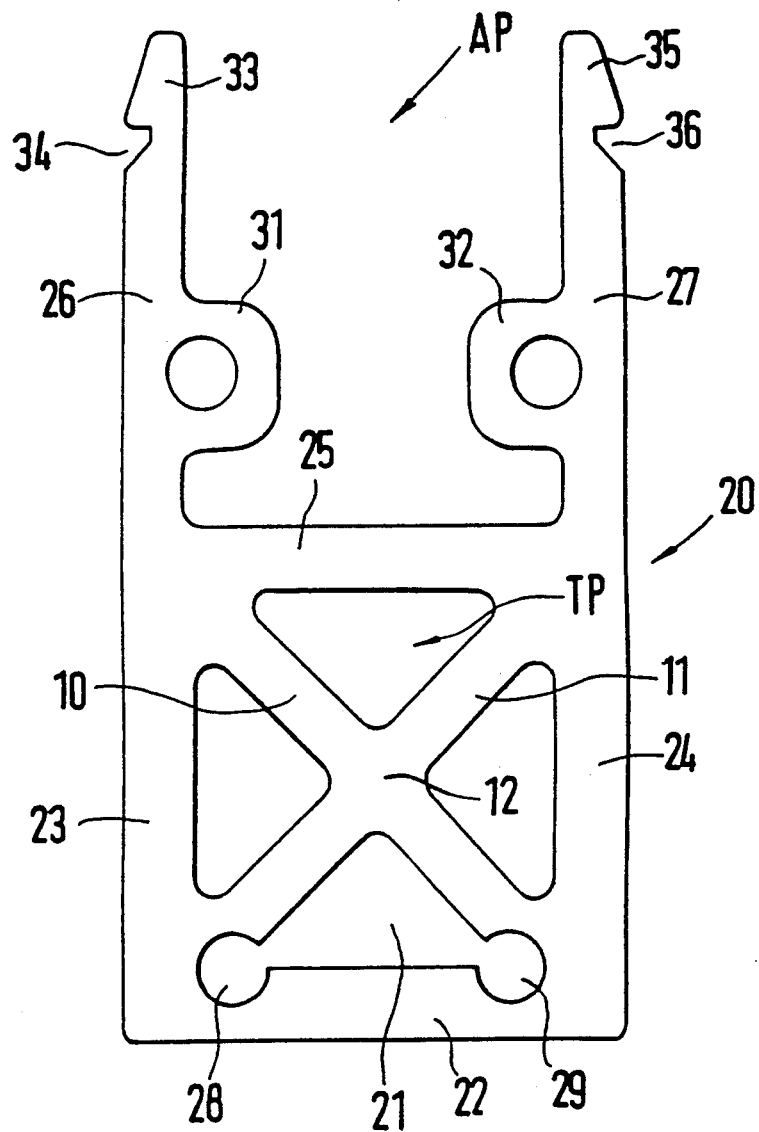

BRACKET FOR A SUSPENSION SYSTEM FOR CONTROL UNITS, CONTROL PANELS AND THE LIKE

BACKGROUND OF THE INVENTION

1. Field of the Invention

This invention relates to a bracket for a suspension system for control units, control panels and the like, including a support body portion, having a substantially U-shaped base profile section that is subdivided, by means of a separation rib extending parallel to its rib, into a closed supporting part and an open, U-shaped receiving part remote from the rib, in which continuous, longitudinally positioned screw receptacles are formed on the support part and the receiving part.

2. Description of Prior Art

A bracket of this type is known from German Patent 38 05 425. The separating rib of the base profile portion increases the stability of the bracket, and the screw receptacles of the support body portion serve to install angles, intermediate joints, couplings and the like. In this known bracket, the screw receptacles are formed onto the side legs of the U-shaped base profile portion and are provided with a longitudinal slit. The screw receptacles enclose only a small portion of the bracket cross section, so that if the cross section is small, adequate torsional rigidity of the bracket is not achieved.

Increasing torsional rigidity can be achieved by enlarging the bracket cross section. This results in a heavy, expensive bracket that moreover makes the suspension arrangement look too bulky.

SUMMARY OF THE INVENTION

It is one object of this invention is to provide a bracket in which without altering the cross section, the torsional rigidity of the suspension arrangement overall can be substantially increased.

According to this invention, the above object is achieved in that the support part is stiffened in the longitudinal direction of the support body portion with two continuous diagonal ribs, which are joined together in the middle. The screw receptacles of the support part are made in the corner regions that the diagonal ribs form with the base profile section.

With the two diagonal ribs, the torsional rigidity of the bracket is substantially increased, and shifting the screw receptacles in the support part to the corner regions between the diagonal ribs and the rib of the base profile section provides a substantially larger connecting surface area for the installation of angles, intermediate joints, couplings and the like, which likewise increases the torsional rigidity of the entire suspension arrangement.

For the sake of manufacturing considerations, the transitions from the diagonal ribs to the base profile section and to the separating rib and the connecting points of the diagonal ribs are all rounded in a concave fashion.

The thickness of each diagonal rib is preferably approximately equal to the thickness of the separating rib, and the screw receptacles in the receiving part are closed, so that they meet the strength requirements.

This invention is described in detail below in terms of one preferred embodiment shown in the drawing.

BRIEF DESCRIPTION OF THE DRAWING

The sole figure of the drawing shows the bracket in cross section.

DESCRIPTION OF PREFERRED EMBODIMENTS

The bracket of this invention is constructed in the appropriate length in the form of a support body section 20 from a suitable extruded profile section. The base profile section 21 is essentially U-shaped; the rib 22 is adjoined by the side arm portion 23 and 26 on the one side and 24 and 27 on the other side.

The separating rib 25, extends parallel to the rib 22 and subdivides the base profile section 21 into the closed support part TP and the U-shaped receiving part AP, which is open at the top. The support part TP is formed by the rib 22, the side arm portions 23 and 24, and the separating rib 25. The receiving part AP is formed by the separating rib 25 and the side arm portions 26 and 27 and functions to receive supply lines. The support part TP is stiffened by the two diagonal ribs 10 and 11, which are joined together in the middle, as shown by the region 12 in the drawing.

The transitions between the diagonal ribs 10 and 11 and the rib 22, the separating rib 25 and the side arm portions 23 and 24 are rounded in a concave fashion. The same is true for the connecting parts of the diagonal ribs 10 and 11 in the connecting region 12. The screw receptacles 28 and 29 of the support part TP are shifted into the corner regions between the diagonal ribs 10 and 11 and the rib 22 of the base profile section 21, in order to attain the largest possible connecting surface area for the parts to be installed, such as angles, intermediate joints, couplings and the like. The screw receptacles 31 and 32 in the receiving part AP are closed, so that they can better absorb torque forces when stressed.

The side ar portions 26 and 27 terminate in the form of the connecting ends 33 and 35, which are provided with undercuts 34 and 36 so that a cap can be locked on the receiving part AP. The cap closes the receiving part AP but can be removed easily. With the additional diagonal ribs 10 and 11, the torsional rigidity of the bracket can be improved substantially while maintaining the same bracket cross section, without unduly increasing the weight. The enlarged connecting surface area between the screw receptacles also contributes to making the entire suspension arrangement more torsionally rigid.

What is claimed is:

1. In a bracket for a suspension system for control units or control panels, having a support body with a substantially U-shaped base profile section that is subdivided by a separation rib extending parallel to a rib of the base profile section into a closed supporting part and an open U-shaped receiving part remote from the rib, in which continuous, longitudinally oriented screw receptacles are formed on the support part and the receiving part, the improvement comprising:

the support part (TP) stiffened in a longitudinal direction of the support body (20) by two continuous diagonal ribs (10, 11) which are joined together in the middle, the screw receptacles (28, 29) of the support part (TP) each positioned in a corner region where said diagonal ribs (10, 11) join with the base profile portion (21), and the screw receptacles (31, 32) of the receiving part (AP) being closed.

2. In a bracket according to claim 1, wherein each transition from the diagonal ribs (10, 11) to the base profile section (21) and to a separating rib (25) and a plurality of connecting points of said diagonal ribs (10, 11) are all rounded in a concave fashion.

3. In a bracket according to claim 2, wherein a first thickness of each of said diagonal ribs (10, 11) is approximately equal to a second thickness of said separating rib (25).

4. In a bracket according to claim 1, wherein a first thickness of each of said diagonal ribs (10, 11) is approximately equal to a second thickness of said separating rib (25).

* * * * *